Figure 1:
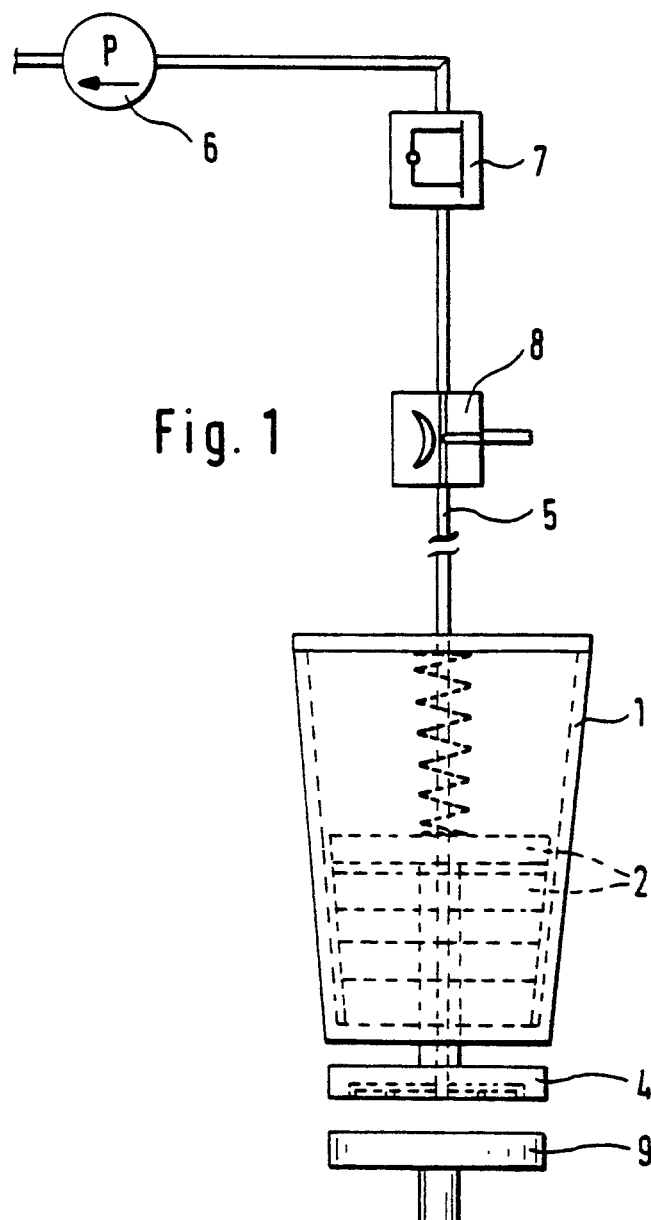

United States Patent

Linder et al.

[11] Patent Number: 5,121,551
[45] Date of Patent: Jun. 16, 1992

[54] DEVICE FOR THE EXCHANGEABLE FASTENING OF A PROBE PIN

[75] Inventors: Kurt Linder, Karlsrube; Martin Schreiner, Dillingen, both of Fed. Rep. of Germany

[73] Assignee: Wegu Messtechnik GmbH, Wadgassen, Fed. Rep. of Germany

[21] Appl. No.: 749,672

[22] Filed: Aug. 26, 1991

[30] Foreign Application Priority Data

Nov. 10, 1990 [DE] Fed. Rep. of Germany ....... 4035841

[51] Int. Cl.⁵ .................................................. G01B 5/03
[52] U.S. Cl. ................................... 33/556; 33/559; 33/572
[58] Field of Search ............... 33/23.11, 1 M, 572, 33/559, 560, 561, 556, 557, 558, 558.3, DIG. 2

[56] References Cited

U.S. PATENT DOCUMENTS 4,649,623 3/1987 Schneider et al. .
5,040,931 8/1991 Spivey et al. ............. 33/559 X
5,041,806 8/1991 Enderle et al. ............ 33/561 X

FOREIGN PATENT DOCUMENTS 0128464 5/1984 European Pat. Off. .
3320127 12/1984 Fed. Rep. of Germany .
3803031 11/1988 Fed. Rep. of Germany .
3811851 10/1989 Fed. Rep. of Germany .
8419749 9/1990 Fed. Rep. of Germany .

OTHER PUBLICATIONS

Automatische Tasterwechseleinrichtung fur Koordinatenmebgerate from the publication entitled Qualitat und Zuverlassigkeit, May, 1990, by Hans Ulrich Golz, Karlsruhe.

Primary Examiner—Harry N. Haroian
Attorney, Agent, or Firm—Wood, Herron & Evans

[57] ABSTRACT

A device for the exchangeable fastening of a probe pin or probe pin combination (3) on the probe head (1) of a coordinate measuring system is taught where a pneumatically operated clamping device is provided which between the connecting body (9) of the probe pin (3) and the mounting body (4) in the probe head (1) generates a vacuum serving as a holding force. A venting valve (8) and an electrical blocking valve (7) are installed in the vacuum line (5) between a vacuum pump (6) and the probe head (1).

7 Claims, 1 Drawing Sheet

DEVICE FOR THE EXCHANGEABLE FASTENING OF A PROBE PIN

The invention concerns a device for the exchangeable fastening of a probe pin or a probe pin combination on the probe head of a coordinate measuring system on which a clamping device pulls a connecting body of the probe pin or the probe pin combination against a support on the mounting body of the probe head, which support determines the position of the probe pin or probe pin combination.

Previously known from the European patent application EP 0 128 464 A2 is a probe pin exchange holder where the clamping device consists of a permanent magnet and a solenoid whose field is superimposed on that of the permanent magnet. The connecting body of the probe pin or probe pin combination is by this clamping device pulled on a support in the mounting body on the probe head, which support determines the probe pin position. The mounting device features a so-called isostatic three-point support against which a contact plate of the probe pin, consisting of three components, is pulled by the electromagnetic clamping device. In an automatically controlled probe change, direct current is fed to the solenoid, thereby creating a magnetic field whose amount corresponds approximately to that of the permanent magnet used, whereas its direction is opposite. Thus, the resulting overall magnetic field becomes nearly zero. Due to this superimposition, the adhesive force between the magnet and the three-part plate disappears, so that the probe pin combination can be released from the mounting body with the utilization of dish springs.

Previously known from the German patent disclosure DE 38 11 851 A1 is an exchangeable mounting of a probe pin on the probe head of a coordinate measuring device which is characterized by only few and technically simple means in using an electrically operating clamping device. The connecting body of the probe pin is of a cup type design and arranged coaxially below the mounting body. The connecting body receives a steel ring, which is connected to the mounting body, at a radial spacing from the cylinder wall of the connecting body. Installed in the connecting body, centrically, is a coil body with a coil winding whose upper collar, attached as one piece, supports on its end side the permanent magnet while with its shell surface it is arranged radially spaced from the steel ring in the connecting body. The connecting body equipped with the probes, thus, is held only by a narrow end face of a steel ring which along with the mounting body of the pin head is fastened by screws.

The German utility patent G 84 19 749 U1 teaches a change coupling for precise manual or computer-controlled exchange of probe arms, probe arm groups or of tools. In the case of this change coupling, the two coupling parts to be connected with each other are locked in place at three points by means of ball-shaped elements, in three V-shaped grooves whose angular bisecting lines preferably lie in the plane of the three ball centers. The position of the two coupling parts relative to each other is secured by an additional gate type or tapered depression in one of the three grooves and by springing a bearing point in the said plane.

From the German patent disclosure DE 38 03 031 A1, lastly, there is known a convertible device for holding and positioning of bodies, especially of parts to be measured by means of a measuring device. The convertible elements of this device comprise a tubular sleeve which is movable by means of a foot that is subjected to pneumatic buoyancy, and comprise a rod which within the tubular sleeve is axially movable and on the upper section of which the said devices for holding and positioning can be fixed.

Coordinate measuring apparatuses represent presently a high state in linear measuring technology. They are characterized by flexibility, universal application and high accuracies. An essential requirement for measuring apparatuses of this type, in flexible manufacturing systems, is the possibility of an automatic measuring of a broad parts spectrum. This can be performed in the case of coordinate measuring systems not exclusively with a single, universal probe, so that an automatic probe change is required. The requirements which such probe change devices must meet are that a sufficiently large number of probes is made available, that a limitation of the measuring range of the coordinate measuring apparatus is not given, that a collision between the coordinate measuring apparatus and the probe change device will be avoided, and that, at last, the activation occurs out of the measuring program.

Basing on the above prior art and the previously cited requirements, the problem underlying the invention is to provide a device of the initially cited type which assures the exchange of a probe pin or probe pin combination on the probe head of a coordinate measuring apparatus in a technically simple way and, additionally, with simple means and nonproblematically.

This problem is inventionally solved in that a pneumatically operating clamping device is provided which creates a vacuum between the connecting body of the probe pin or the probe pin combination and the mounting body in the probe head, which vacuum acts as a holding force. To that end, a vacuum pump generating the vacuum may be provided, which by means of a vacuum line is connected with the mounting body in the probe head, with a controllable venting valve installed in the vacuum line. An electrically operating blocking valve may be installed between the vacuum pump and the venting valve.

As a further development of the invention, the mounting body or the connecting body of the probe pin or probe pin combination may be fashioned as a suction cup. Moreover, the mounting body and/or connecting body of the probe pin or probe pin combination may be designed as a plate, disk or similar. Lastly, the mounting body may be fixedly connected with a deflecting mechanism of the probe [pin] or probe pin combination.

While the prior designs operate on a magnetic and electromagnetic basis, which disadvantageously have a thermal effect on the probe and, furthermore, as another disadvantage, have a residual magnetism in laying down the probe pin, the inventional probe pin exchange system operates pneumatically. This means that the necessary adhesive force between the probe or probe pin combination is generated by a vacuum. This vacuum is produced by a vacuum pump at whose failure the holding force is maintained for a certain period of time by means of an electrical blocking valve. The formfit of the adjacent plates, necessary for torsional safety, is guaranteed by generally known constructions, for instance balls and rolls or similar design elements. The various pinhead combinations are stored in a probe pin magazine which is attached to the measuring apparatus. For placement of a probe pin combination in a magazine, air is admitted in the vacuum line to the changer via an electrical valve.

An embodiment of the invention is illustrated in the drawing.

Figure 2:
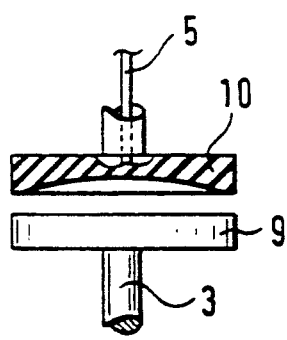

FIG. 1 shows a device for the exchangeable mounting of a probe pin on the probe head of a coordinate measuring apparatus, in schematic and greatly simplified illustration;

FIG. 2, a connecting body of the probe pin and the mounting body in as well heavily simplified representation.

A probe head 1 of a coordinate measuring apparatus of known design, not illustrated in detail, accommodates a deflecting mechanism 2 which allows a probe pin or probe pin combination 3 to swing out of its rest position in the approach to a measuring object. This deflection of the probe pin or probe pin combination 3 normally produces an electrical signal which stops the presently assumed path of the probe head of the coordinate measuring apparatus and marks and evaluates the scanned measuring value.

A mounting body 4 in the form of a plate is fixedly connected with this deflection mechanism 2. This plate, or the mounting body 4, communicates with a vacuum line 5 originating from a vacuum pump 6. An electrical blocking valve 7 and an electrical venting valve 8 are installed in the vacuum line 5 between the vacuum pump 6 and the probe head 1.

The probe pin or probe pin combination 3 comprises a connecting body 9, which in the illustrated embodiment is of a plate type design.

As illustrated schematically in FIG. 2, the mounting body 4 on the probe head may be designed, instead of plate-shaped, also as a suction cup 10. In this case, the connecting body 9 of the probe pin or probe pin combination 3 may again be designed as a plate 9.

The probe pin combination features several probe arms 11 with probe balls 12 arranged on their ends.

The probe pin or probe pin combination 3 is customarily kept in a prior magazine (not illustrated) of a coordinate measuring apparatus. In order to make it possible for the probe head 1 to pick up this probe pin combination 3, the mounting body 4 is moved above the connecting body 9 under computer control. The mounting body 4 is then brought in bearing contact with the connecting body 9. Next, a vacuum is generated between the mounting body 4 and the connecting body 9, by a vacuum pump 6 via vacuum line 5, which is possible through an appropriate design of the surfaces of components arranged in matching fashion, namely the mounting body 4 and the connecting body 9. The vacuum built up between the mounting body 4 and the connecting body 9 thus serves as a holding force between the probe head 1 and the probe pin combination 3.

The formfit between the plate-shaped elements 4 and 9 or between the suction cup 10 and the plate 9, necessary for torsional safety, is assured through constructions known as such using ball elements, rolls or similar design elements.

To enable the placement of a probe pin or probe pin combination 3 in a magazine, the vacuum line 5 is briefly aerated via an electrical valve 8 under computer control. This eliminates the vacuum as a holding force, releasing the probe head combination 3 from the probe head 1.

In case of a failure of the vacuum pump 6 during the measuring operation, the holding force is maintained at least for a certain period of time by means of an electrical blocking valve 7 in the vacuum line 5.

We claim:

1. A contact probe assembly for a measuring system, comprising
    a contact probe pin having an outer contact end adapted to contact a member to be measured and having an inner connecting end,
    a probe head having a deflectable element extending therefrom to generate a signal upon deflection thereof, said deflectable element including a mounting member, and
    vacuum holding means for generating a vacuum holding force for selectively detachably connecting said inner connecting end of said contact probe pin and said mounting member of said deflectable element of said probe head.

2. The contact probe assembly of claim 1 wherein said vacuum holding means includes
    first and second vacuum sealable surfaces respectively provided on said inner connecting end of said contact probe pin and said mounting member of said deflectable element of said probe head, said first and second surfaces matingly engageable at an interface therebetween, and
    a source of vacuum communicating via a vacuum line with said interface of said first and second surfaces for applying a vacuum holding force therebetween when said vacuum line is uninterrupted.

3. The contact probe assembly of claim 2 wherein said vacuum holding means further comprises a controllable venting valve connected to said vacuum line to selectively interrupt the supply of vacuum between said vacuum source and said interface to facilitate selective disengagement of said first and second surfaces and selective detachment of said contact probe pin from said probe head.

4. The contact probe assembly of claim 2 wherein said vacuum holding means further includes a vacuum pump and a selectively operable blocking valve connected in said vacuum line between said vacuum pump and said venting valve to maintain vacuum in said line between said blocking valve and said interface in the event said vacuum pump is inoperative, and thereby maintain said first and second surfaces engaged notwithstanding inoperativeness of said vacuum pump.

5. The contact probe assembly of claim 2 wherein one of said first and second surfaces includes a suction cup which matingly engages with the other of said surfaces to establish a vacuum holding force for selectively detachably connecting said inner connecting end of said contact probe pin and said mounting member of said deflectable element of said probe head.

6. The contact probe assembly of claim 4 wherein said other of said surfaces is a plate.

7. The contact probe assembly of claim 1 wherein said mounting member is fixedly secured to said deflectable element.

* * * * *